(12) United States Patent
Hui et al.

(10) Patent No.: US 10,294,958 B2
(45) Date of Patent: May 21, 2019

(54) FAN BLADE ASSEMBLY

(71) Applicant: UNITED TECHNOLOGIES CORPORATION, Farmington, CT (US)

(72) Inventors: Kwan Hui, Tucker, GA (US); Michael A. Weisse, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 480 days.

(21) Appl. No.: 15/024,126

(22) PCT Filed: Sep. 12, 2014

(86) PCT No.: PCT/US2014/055467
§ 371 (c)(1),
(2) Date: Mar. 23, 2016

(87) PCT Pub. No.: WO2015/047755
PCT Pub. Date: Apr. 2, 2015

(65) Prior Publication Data
US 2016/0215789 A1    Jul. 28, 2016

Related U.S. Application Data

(60) Provisional application No. 61/881,822, filed on Sep. 24, 2013.

(51) Int. Cl.
| | |
|---|---|
| *F01D 5/14* | (2006.01) |
| *F01D 5/18* | (2006.01) |
| *F04D 29/02* | (2006.01) |
| *F04D 29/38* | (2006.01) |
| *F04D 29/64* | (2006.01) |

(Continued)

(52) U.S. Cl.
CPC ............ *F04D 29/388* (2013.01); *B23P 15/04* (2013.01); *F01D 5/147* (2013.01); *F01D 5/18* (2013.01); *F01D 5/288* (2013.01); *F04D 29/023* (2013.01); *F04D 29/324* (2013.01); *F04D 29/325* (2013.01); *F04D 29/644* (2013.01); *F05D 2220/36* (2013.01); *F05D 2230/23* (2013.01)

(58) Field of Classification Search
CPC ......................... F05D 2240/301; F04D 29/388
USPC ........................................ 416/224, 232, 233
See application file for complete search history.

(56) References Cited

U.S. PATENT DOCUMENTS 3,606,580 A * 9/1971 Kaufman, Sr. .......... B21H 7/16
                                              416/232
6,431,837 B1 * 8/2002 Velicki .................... F01D 5/282
                                              416/223 R (Continued)

OTHER PUBLICATIONS

PCT International Search Report for International Application No. PCT/US2014/055467; International Filing Date: Sep. 12, 2014; dated Dec. 22, 2014; 3 pgs.

(Continued)

*Primary Examiner* — Christopher Verdier
*Assistant Examiner* — Jason G Davis
(74) *Attorney, Agent, or Firm* — Cantor Colburn LLP

(57) ABSTRACT

The present disclosure relates generally to a cover for a fan blade. The cover encloses a hollowed portion formed in the fan blade and includes at least one extending portion that wraps around at least one of a trailing edge, a leading edge, and a root of the fan blade.

19 Claims, 7 Drawing Sheets

(51) Int. Cl.
    *B23P 15/04*     (2006.01)
    *F01D 5/28*     (2006.01)
    *F04D 29/32*     (2006.01)

(56)     References Cited

U.S. PATENT DOCUMENTS

| | | | |
|---|---|---|---|
| 7,189,064 B2 * | 3/2007 | Helder | B23K 20/122 |
| | | | 416/232 |
| 8,944,773 B2 * | 2/2015 | Weisse | F01D 5/147 |
| | | | 416/229 R |
| 2003/0129061 A1 | 7/2003 | Finn | |
| 2005/0254946 A1 | 11/2005 | Christopherson | |
| 2005/0254955 A1 | 11/2005 | Helder | |
| 2006/0039792 A1 | 2/2006 | Ferte | |
| 2011/0211965 A1 | 9/2011 | Deal | |

OTHER PUBLICATIONS

PCT Written Opinion for International Application No. PCT/US2014/055467; International Filing Date: Sep. 12, 2014; dated Dec. 22, 2014; 6 pgs.

European Search Report for Application No. 14 84 7762.

\* cited by examiner

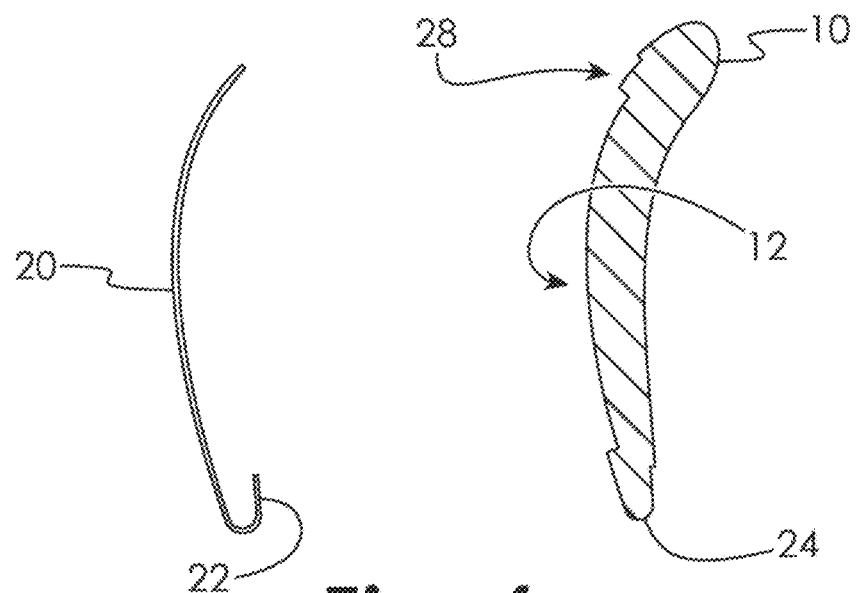
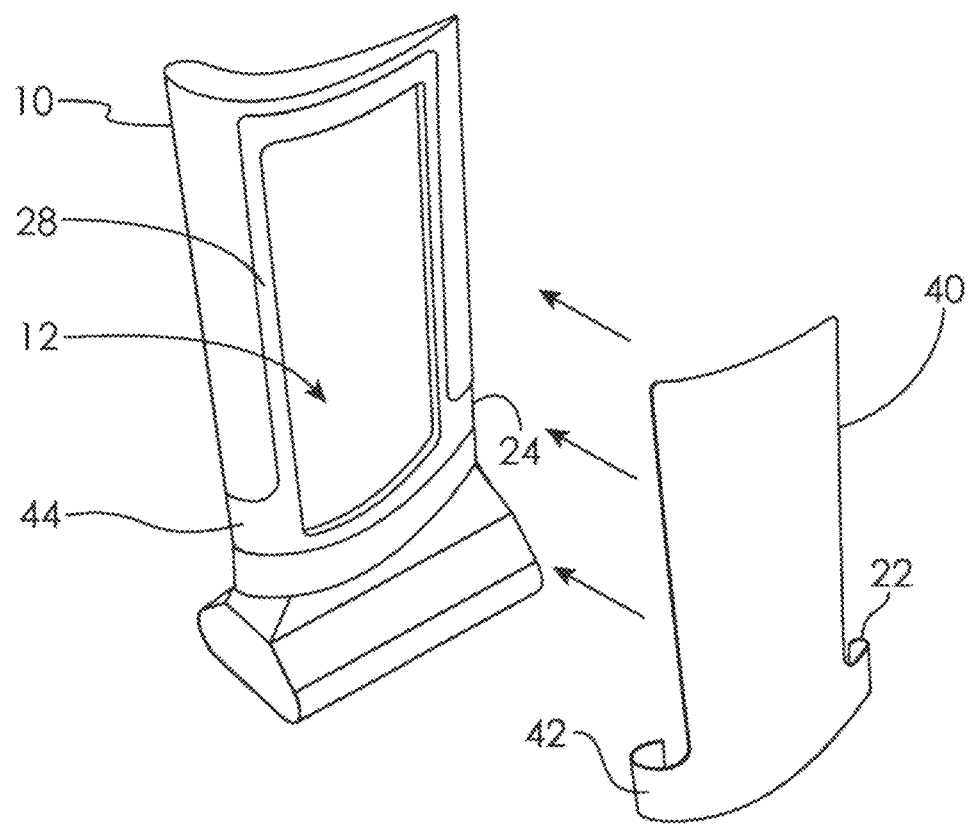

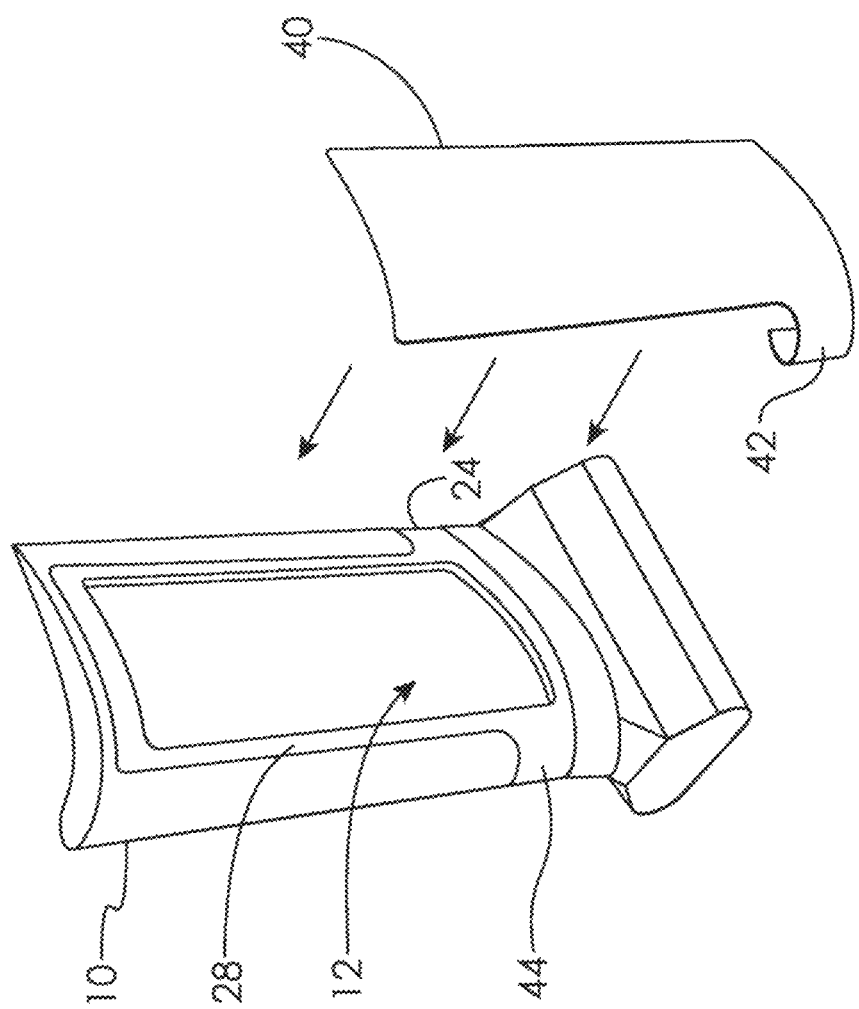

US 10,294,958 B2

FAN BLADE ASSEMBLY

CROSS-REFERENCE TO RELATED APPLICATIONS

The present application claims the benefit of and incorporates by reference herein the disclosure of U.S. Ser. No. 61/881,822 filed Sep. 24, 2013.

TECHNICAL FIELD OF THE DISCLOSURE

The present disclosure is generally related to fan blades for use in gas turbine engines and, more specifically, to a fan blade assembly for use in gas turbine engines

BACKGROUND OF THE DISCLOSURE

Fan blades for use in many gas turbine engines comprise a hollowed blade body with a cover glued on to the blade body on the suction side of the blade. The cover closes the hollowed portion of the blade to complete the aerodynamic shape of the blade. This has the benefit of lowering the weight of the fan blade, minimizing the adverse impact of the hollowed portions on the aerodynamic profile of the blade if left uncovered, and lowers the cost of a fan blade compared with diffusion bonding. One of the risks inherent in the bonded cover design is the reliability of the adhesive used to attach the cover. If the capability of the adhesive in an engine environment over the time span at which the engine could be operated is degraded, or if there were loss of cover adhesion during a bird impact event, the cover loss could cause an imbalance for the fan hub to which the fan blade is attached. Improvements are therefore still needed in the art.

SUMMARY OF THE DISCLOSURE

In one embodiment, a fan blade assembly is disclosed, comprising: a fan blade comprising: a fan blade body including a leading edge and a trailing edge; a hollowed portion formed in the fan blade body; a cover bonded to the fan blade, the cover including at least one extending portion; wherein the cover encloses the hollowed portion; and wherein the at least one extending portion of the cover wraps around at least one of the leading edge and trailing edge.

In another embodiment, a fan blade assembly is disclosed, comprising: a fan blade comprising: a fan blade body including a leading edge and a trailing edge; a hollowed portion formed in the fan blade body; a first cover bonded to the fan blade; a second cover bonded to at least one of the first cover and the fan blade, the second cover including at least one extending portion; wherein the first cover encloses the hollowed portion; and wherein the at least one extending portion of the second cover wraps around at least one of the leading edge and the trailing edge.

In another embodiment, a fan blade assembly is disclosed, comprising: a fan blade comprising: a fan blade body including a leading edge, a trailing edge and a root; a hollowed portion formed in the fan blade body; a cover bonded to the fan blade, the cover including at least one extending portion; wherein the cover encloses the hollowed portion; and wherein the at least one extending portion of the cover wraps around at least one of the leading edge, the trailing edge and the root.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 4 is a schematic cross-sectional view of a fan blade assembly in an embodiment.

FIG. 5 is a schematic perspective view of a fan blade assembly in an embodiment.

FIG. 5A is a schematic perspective view of a fan blade assembly in an embodiment.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
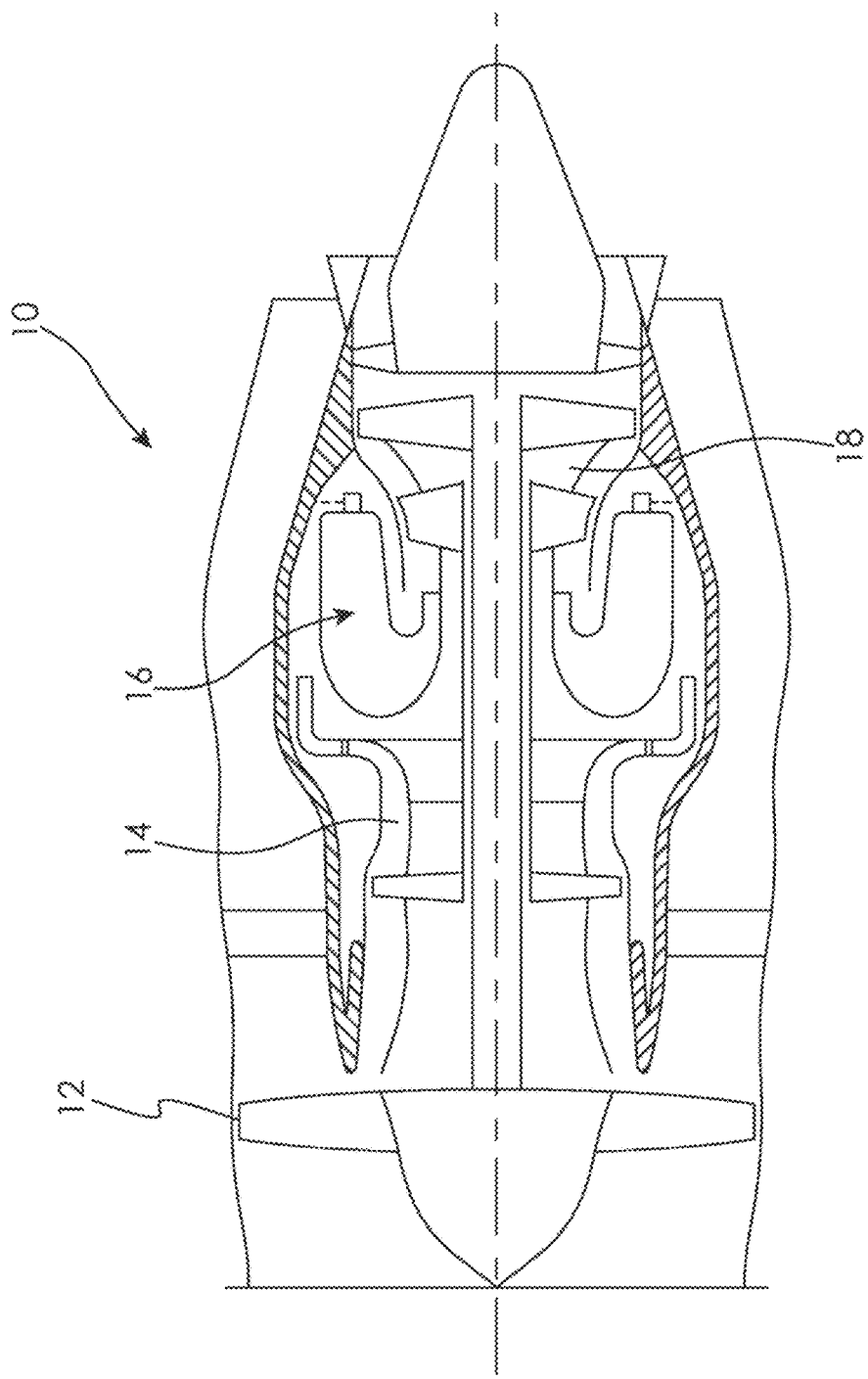
FIG. 1 is a schematic cross-sectional view of a gas turbine engine.

FIG. 1 illustrates a gas turbine engine 10 of a type normally provided for use in a subsonic flight, generally comprising in serial flow communication a fan 12 through which ambient air is propelled, a compressor section 14 for pressurizing a portion of the air (the gas path air), a combustor 16 in which the compressed air is mixed with fuel and ignited for generating a stream of hot combustion gases, and a turbine section 18 for extracting energy from the combustion gases.

Figure 2:
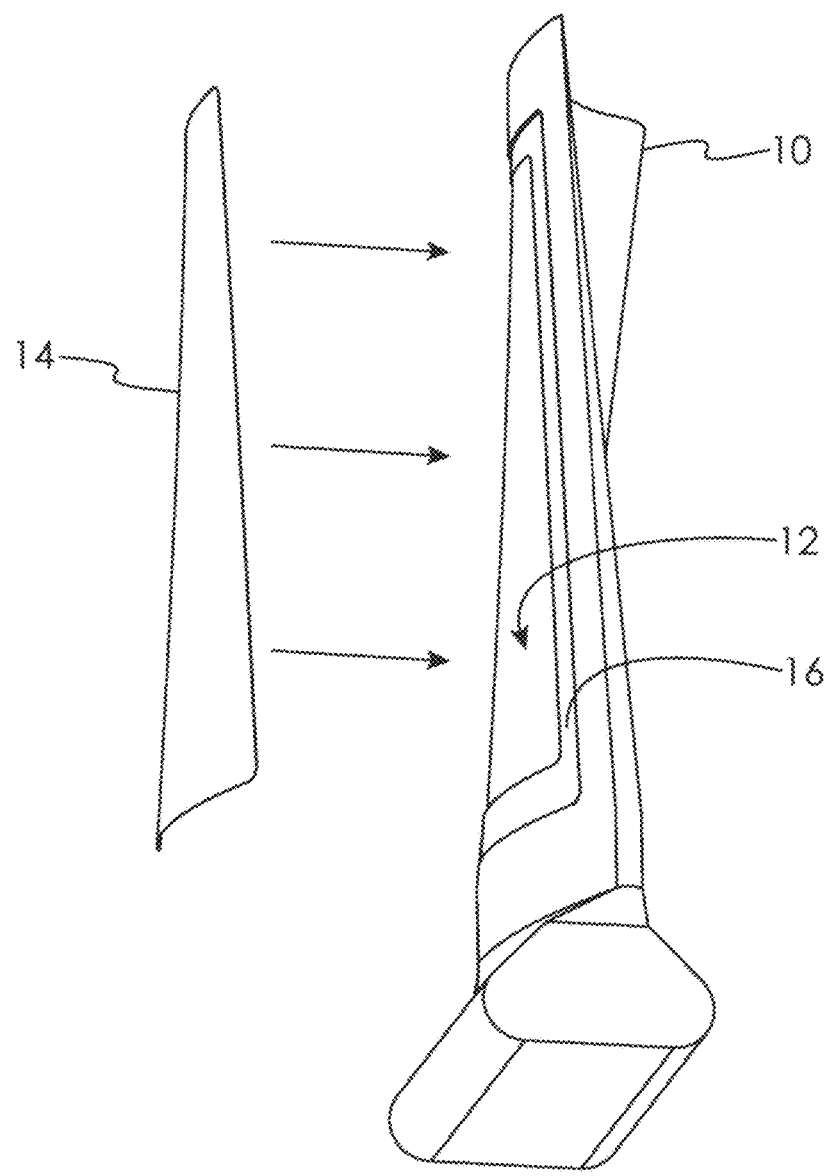
FIG. 2 is a schematic perspective view of a fan blade assembly in an embodiment.

FIG. 2 schematically illustrates an exploded view of a fan blade 10 having a hollowed portion 12 formed therein and a cover 14 that is placed over the hollowed portion 12 in order to enclose the hollowed portion 12. The dimensions and the contours of the cover 14 match those of the periphery 16 of the hollowed portion, such that when the cover 14 is adhesively bonded to the periphery 16 of the hollowed portion 12, the surface of the combined fan blade 10/cover 14 forms a desired aerodynamic shape.

Figure 3:
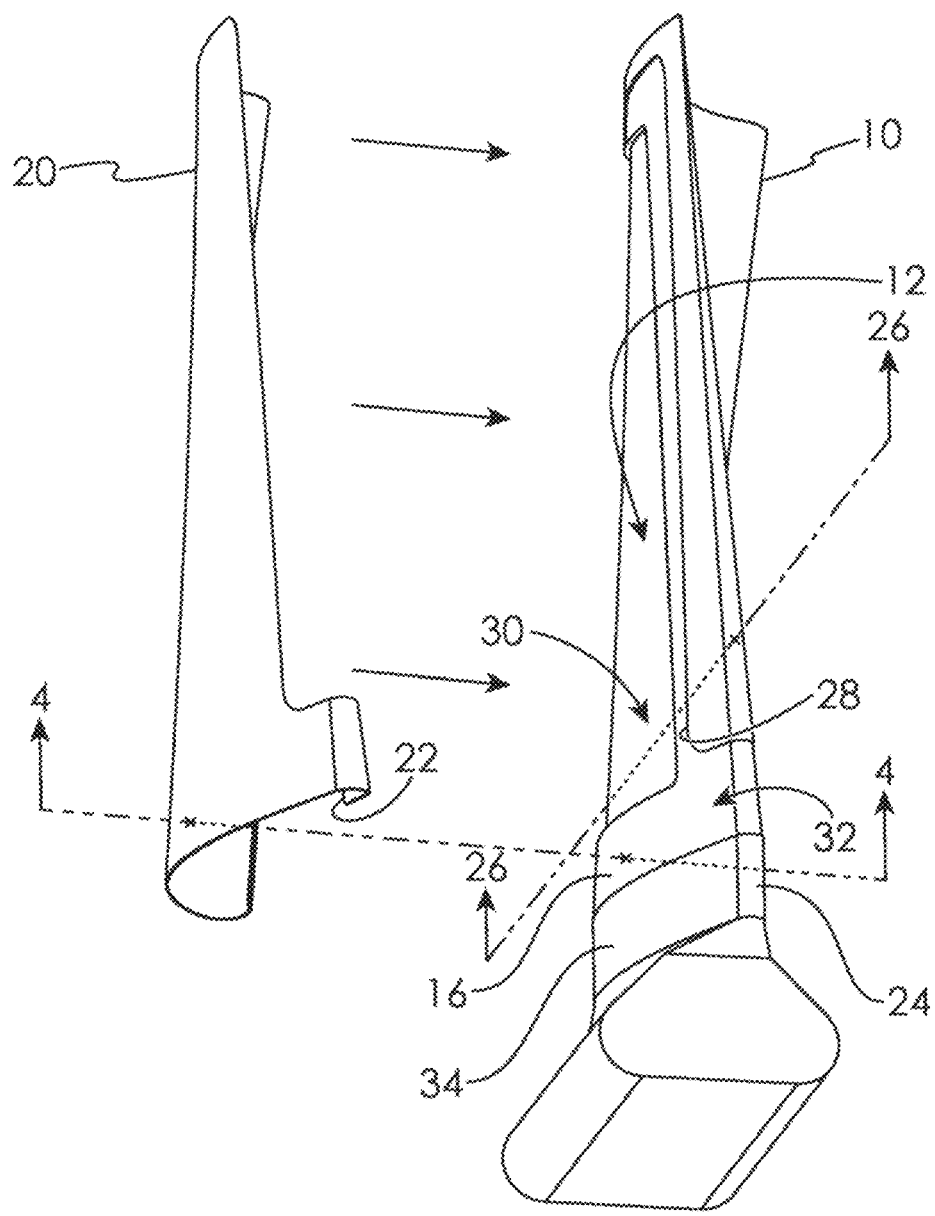
FIG. 3 is a schematic perspective view of a fan blade assembly in an embodiment.

As shown in FIG. 3, a cover 20 in an embodiment is also designed for closing the hollowed portion 12 of the fan blade 10. However, the cover 20 includes an extending portion 22 that extends past the periphery 16 of the hollowed portion 12 and wraps around the fan blade 10 body at the trailing edge 24 (with reference to a gas flowpath around the fan blade 10 when in use). As shown in FIG. 3, the extending portion 22 is disposed below the gas flowpath boundary 26 in an embodiment. When the extending portion 22 of the cover 20 (which may be proud of the fan blade 10 body) is below the gas flowpath boundary 26, adverse effects to the fan blade 10 aerodynamics are prevented. Although the cover 20 is bonded to the fan blade 10 using an adhesive, the extending portion 22 that wraps around the fan blade 10 provides a mechanical connection to the fan blade 10 in addition to the adhesive connection.

FIG. 4 illustrates a cross-sectional view of the fan blade 10 and cover 20 in an embodiment. An indentation 28 around the periphery 16 of the hollowed portion 12 provides a space for the cover 20 to seat while maintaining a smooth outer surface transition between the fan blade 10 and the cover 20. Referring again to FIG. 3, the area 30 is a high stress area for the cover 20 and adhesive in designs without an extending portion 22 that wraps around the fan blade 10. Provision of the extending portion 22 provides mechanical support to the area 30 and distributes this stress over a broader area. In an embodiment, the indentation 28 around the periphery 16 of the hollowed portion 12 may include a flared out portion 32 extending onto the fan blade surface 34 under the location of the extending portion 22 in order to provide for a flush fit between the fan blade 10 and the cover 20 in this area and to minimize stress concentrations on the fan blade 10 body.

Figure 6:
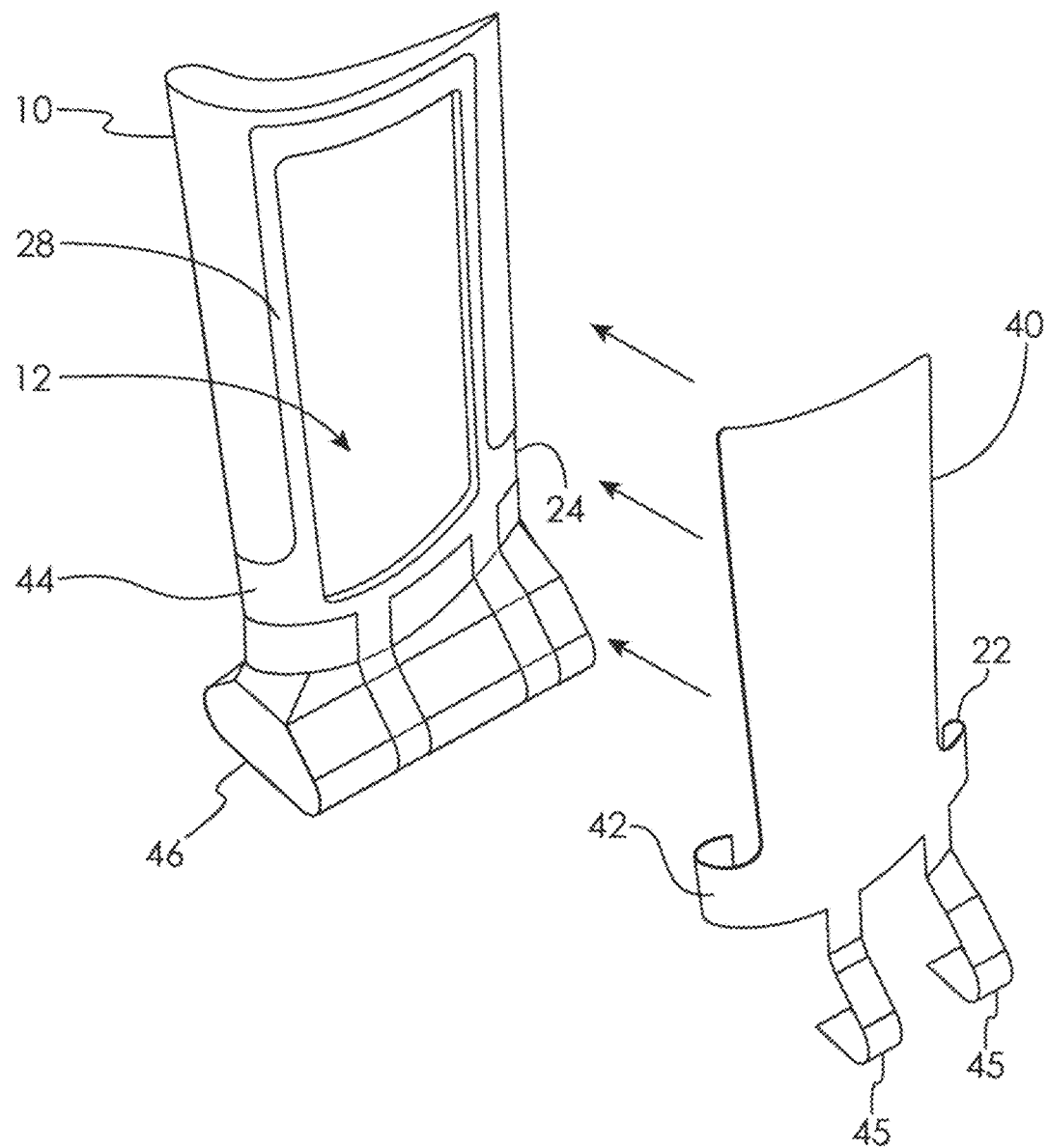
FIG. 6 is a schematic perspective view of a fan blade assembly in an embodiment.

As shown in FIG. 5, a cover 40 may have an extending portion 22 at the trailing edge 24 and an extending portion 42 at the leading edge 44 in an embodiment. In another embodiment and as illustrated in FIG. 5A, the cover 40 may include only the extending portion 42 wrapping around the fan blade 10 body at the leading edge 44 and no extending portion 22 at the trailing edge 24. In other embodiments, the cover 40 may include one or more extending portions 45 that wrap around the root 46 of the fan blade 10, either instead of or in addition to an extending portion 22 at the trailing edge 24 and/or an extending portion 42 at the leading edge 44, as shown in FIG. 6.

Figure 7:
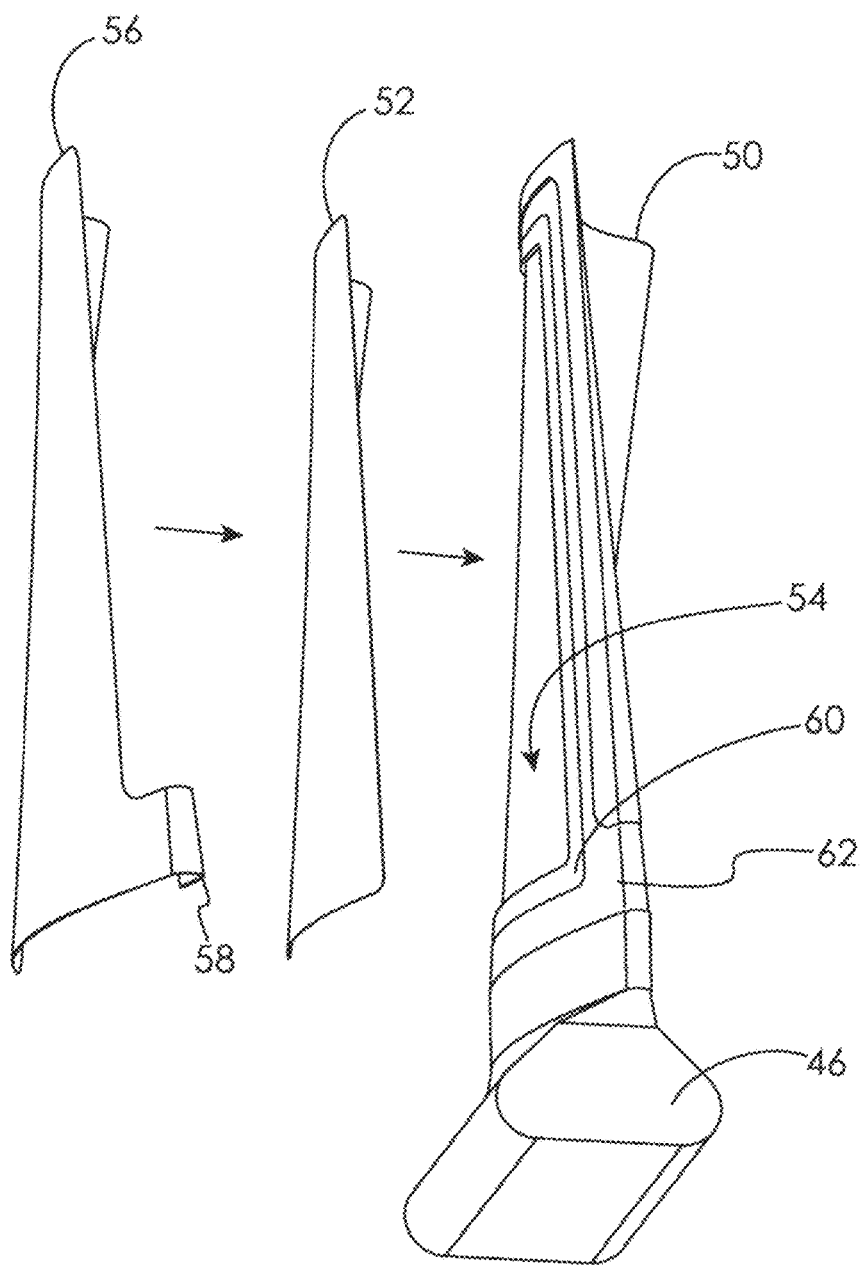
FIG. 7 is a schematic perspective view of a fan blade assembly in an embodiment.

As shown in FIG. 7, a fan blade 50 may have an inner cover 52 without extending portions enclosing the hollowed portion 54, as well as an outer cover 56 having an extending portion(s) 58 positioned at least partially over the inner cover 52 in an embodiment. The fan blade 50 may be provided with stepped indentations 60 and 62 to receive, respectively, inner cover 52 and outer cover 56 in an embodiment. Adhesively bonding the inner cover 52 and the outer cover 56 with an extending portion(s) 58 to the periphery of the hollowed portion 54 increases the adhesive area and provides the additional mechanical connection of the extending portion(s) 58. In an embodiment, the outer cover 56 with an extending portion(s) 58 may additionally (or only) bonded to the inner cover 52. In some embodiments, the outer cover 56 may have an extending portion that wraps around the trailing edge and/or the leading edge of the fan blade 50. In other embodiments, a cover may include one or more extending portions 45 that wrap around the root 46 of the fan blade 50, either instead of or in addition to an extending portion at the trailing edge and/or an extending portion at the leading edge. In some embodiments, more than one cover, each having one or more of the extending portions disclosed herein, may be nested on the fan blade 50.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:
1. A fan blade assembly, comprising:
a fan blade comprising:
a fan blade body including a leading edge, a trailing edge, and a root;
a hollowed portion formed in the fan blade body;
a cover bonded to the fan blade, the cover including at least one extending portion;
wherein the cover encloses the hollowed portion; and
wherein the at least one extending portion of the cover wraps around at least one of the leading edge, the trailing edge, and the root, wherein the cover is bonded to the fan blade by an adhesive.

2. The fan blade assembly of claim 1, wherein the hollowed portion includes an indentation around at least a portion of a periphery of the hollowed portion.

3. The fan blade assembly of claim 2, wherein the cover is adhesively bonded to the fan blade at the indentation.

4. The fan blade assembly of claim 2, wherein the indentation extends under the at least one extending portion.

5. The fan blade assembly of claim 1, wherein the at least one extending portion of the cover wraps around only the trailing edge.

6. The fan blade assembly of claim 1, wherein the at least one extending portion of the cover wraps around only the leading edge.

7. The fan blade assembly of claim 1, wherein the at least one extending portion of the cover wraps around both the leading edge and the trailing edge.

8. The fan blade assembly of claim 1, wherein the at least one extending portion is disposed below a gas flowpath when the fan blade assembly is used in a gas turbine engine.

9. A fan blade assembly, comprising:
a fan blade comprising:
a fan blade body including a leading edge and a trailing edge;
a hollowed portion formed in the fan blade body;
a first cover bonded to the fan blade;
a second cover bonded to at least one of the first cover and the fan blade, the second cover including at least one extending portion;
wherein the first cover encloses the hollowed portion; and
wherein the at least one extending portion of the second cover wraps around at least one of the leading edge and the trailing edge.

10. The fan blade assembly of claim 9, wherein the hollowed portion includes an indentation around at least a portion of a periphery of the hollowed portion.

11. The fan blade assembly of claim 10, wherein the first cover is adhesively bonded to the fan blade at the indentation.

12. The fan blade assembly of claim 10, wherein the indentation extends under the at least one extending portion.

13. The fan blade assembly of claim 9, wherein the at least one extending portion of the second cover wraps around only the trailing edge.

14. The fan blade assembly of claim 9, wherein the at least one extending portion of the second cover wraps around only the leading edge.

15. The fan blade assembly of claim 9, wherein the at least one extending portion of the second cover wraps around both the leading edge and the trailing edge.

16. The fan blade assembly of claim 9, wherein the at least one extending portion is disposed below a gas flowpath when the fan blade assembly is used in a gas turbine engine.

17. The fan blade assembly of claim 9, wherein the first cover and the second cover are bonded to the fan blade by an adhesive.

18. The fan blade assembly of claim 9, wherein the second cover is bonded to the first cover.

19. A fan blade assembly, comprising:
a fan blade comprising:
a fan blade body including a leading edge, a trailing edge and a root;
a hollowed portion formed in the fan blade body;
a cover bonded to the fan blade, the cover including at least one extending portion;
wherein the cover encloses the hollowed portion; and
wherein the at least one extending portion of the cover only wraps around one of the leading edge, the trailing edge and the leading edge and the trailing edge.

* * * * *